United States Patent
Mahkonen et al.

(10) Patent No.: US 9,565,587 B2
(45) Date of Patent: Feb. 7, 2017

(54) FLOW MOBILITY FILTER RULE VERIFICATION

(75) Inventors: Heikki Mahkonen, Helsinki (FI); Teemu Rinta-Aho, Espoo (FI); Tony Jokikyyny, Helsinki (FI)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 713 days.

(21) Appl. No.: 13/700,195

(22) PCT Filed: May 28, 2010

(86) PCT No.: PCT/EP2010/057441
§ 371 (c)(1),
(2), (4) Date: Nov. 27, 2012

(87) PCT Pub. No.: WO2011/147465
PCT Pub. Date: Dec. 1, 2011

(65) Prior Publication Data
US 2013/0088966 A1    Apr. 11, 2013

(51) Int. Cl.
*H04W 28/02* (2009.01)
*H04L 29/06* (2006.01)
(Continued)

(52) U.S. Cl.
CPC .......... *H04W 28/0215* (2013.01); *H04L 63/12* (2013.01); *H04L 65/1069* (2013.01);
(Continued)

(58) Field of Classification Search
CPC .. H04L 12/14; H04L 12/1403; H04L 65/1016; H04L 67/14; H04L 41/0893; H04L 47/20; H04L 63/12; H04L 63/20; H04L 65/1069; H04M 15/66; H04M 15/00; H04W 4/24; H04W 28/0215; H04W 80/04; H04W 76/02; H04W 76/025; H04W 28/06; H04W 12/10; H04W 88/16
See application file for complete search history.

(56) References Cited

U.S. PATENT DOCUMENTS 9,380,446 B2 *   6/2016 Zhou ................... H04W 8/02
2009/0182883 A1 *  7/2009 Giaretta et al. .......... 709/228
(Continued)

OTHER PUBLICATIONS

3GPP: "3rd Generation Partnership Project; Technical Specification Group Services and System Aspects; IP Flow Mobility and seamless WLAN offload; Stage 2 (Release 10)", 3GPP Standard; 3GPP TS 23.261, 3rd Generation Partnership Project (3GPP), Mobile Competence Centre, 650, Route Des Lucioles, F-06921 Sophia-Antipoli S Cedex, France, No. v1.1.0, May 25, 2010 (May 25, 2010), XP050441467.

(Continued)

*Primary Examiner* — Yemane Mesfin
*Assistant Examiner* — Peter Chen
(74) *Attorney, Agent, or Firm* — Patents on Demand, P.A.; Brian K. Buchheit; Scott M. Garrett

(57) ABSTRACT

A method and system for flow mobility filter rule verification is provided. According to an embodiment of the present invention, a network node of a telecommunications packet network is configured to receive filter rules provided by a user entity (UE) relating to a requested IP-CAN session. The filter rules are applied by a Policy and Charging Control (PCC) network architecture for the session. The network node is also configured to compare received filter rules with Inter-Mobility Policies (IMPs) of the user in order to determine if the filter rules match with the user's IMPs, and to send a filter rule verification response indicating whether or not the filter rules match the user's IMPs.

14 Claims, 5 Drawing Sheets

(51) Int. Cl.
  *H04M 15/00* (2006.01)
  *H04W 12/10* (2009.01)
  *H04W 28/06* (2009.01)
  *H04W 76/02* (2009.01)
  *H04W 88/16* (2009.01)

(52) U.S. Cl.
  CPC ........... *H04M 15/00* (2013.01); *H04M 15/66* (2013.01); *H04W 12/10* (2013.01); *H04L 63/20* (2013.01); *H04W 28/06* (2013.01); *H04W 76/02* (2013.01); *H04W 88/16* (2013.01)

(56) References Cited

U.S. PATENT DOCUMENTS

| | | | |
|---|---|---|---|
| 2010/0217877 A1* | 8/2010 | Willars et al. | 709/228 |
| 2010/0296415 A1* | 11/2010 | Sachs et al. | 370/254 |
| 2010/0303031 A1* | 12/2010 | Rune | 370/329 |
| 2011/0022722 A1* | 1/2011 | Castellanos Zamora et al. | 709/235 |
| 2011/0065435 A1* | 3/2011 | Pancorbo Marcos | H04W 76/041 455/436 |
| 2011/0201303 A1* | 8/2011 | Cutler et al. | 455/406 |
| 2011/0238547 A1* | 9/2011 | Belling et al. | 705/34 |
| 2012/0144049 A1* | 6/2012 | Lopez Nieto et al. | 709/228 |
| 2012/0250658 A1* | 10/2012 | Eisl et al. | 370/331 |
| 2013/0034019 A1* | 2/2013 | Mustajarvi | 370/254 |
| 2013/0265986 A1* | 10/2013 | Pampu et al. | 370/331 |
| 2014/0161055 A1* | 6/2014 | Chitrapu | H04W 72/12 370/329 |

OTHER PUBLICATIONS

"3rd Generation Partnership Project; Technical Specification Group Services and System Aspects; Policy and charging control architecture (Release 9)", 3GPP Standard; 3GPP TS 23.203, $3^{rd}$ Generation Partnership Project (3GPP), Mobile Competence Centre; 650, Route Des Lucioles ; F-06921 Sophia-Antipolis Cedex, France, No. V9.4.0, Mar. 25, 2010 (Mar. 25, 2010), XP050402048.

* cited by examiner

FLOW MOBILITY FILTER RULE VERIFICATION

FIELD OF THE INVENTION

The present invention relates to a system and method for handling filter rules used to enable a user entity to initiate an IP Connectivity Access Network, IP-CAN session in a telecommunications packet network.

BACKGROUND

With the increase in availability and use of services, such as IP multimedia services, that has occurred since third generation telecommunications networks were introduced, user entities (UEs) often require the use of multiple simultaneous accesses to such networks. This involves the UE requesting multiple simultaneous IP-CAN sessions. However, the networks and/or services often require, or make use of, different access technologies.

The Third Generation Project Partnership (3GPP) is standardizing an Evolved Packet Core (EPC) concept that will converge different access network technologies into a common core network. As part of this EPC architecture UEs can be provided with multiple Packet Data Network (PDN) connectivity capabilities so that the UE can use multiple access networks simultaneously. In addition, EPC will provide IP flow mobility, meaning that a UE can move active flows from one access network to another.

The most prominent global mobility protocol in the EPC network will be the Common Management Information Protocol, CMIP (Dual Stack Mobile IPv6, DSMIPv6) protocol. This will be used for non-3GPP accesses over the reference point S2c. 3GPP is also standardizing an Access Network Discovery and Selection Function (ANDSF), used to provide a UE with information about the access technologies that the UE is allowed to use, or should be using for particular applications, and access priorities. These are referred to as Inter Mobility Policies or IP Flow Policies, which can be accessed by the ANDSF, and include a list of accesses that the UE can use, which accesses the UE should be using for specific applications, and in which priority order. For example the Inter Mobility Policies may specify that all video application traffic should first use a Long Term Evolution, LTE, access and if LTE is not available then WLAN but never 2G or 3G accesses. These Inter Mobility Policies are high level policies that dictate what accesses the UE should use for particular application flows. To use the Inter Mobility Policies, the UE needs to calculate filter rules from them and these filter rules are then installed into the network's Policy and Charging Control (PCC) architecture.

Current activities in 3GPP are ongoing to standardize the multi-PDN connectivity and IP flow mobility. As part of this activity, and as stated in 3GPP TS 23.261 ("IP flow mobility and seamless WLAN offload"), 3GPP will specify how filter rules, that are needed to route specific traffic flows via specified accesses, are installed into the EPC network by the UE. The UE will have the capability to send filter rules to its Home Agent (HA) that normally resides in the Packet Data Network Gateway (PDN-GW). These filter rules are either calculated by the UE from the Inter Mobility Policy set provided by the ANDSF, or by manual configuration. The HA will then forward these filter rules to the PCC architecture that will create an IP-CAN session based on the filter rule set.

According to the 3GPP Technical Specification, TS 23.261, the multi-PDN connectivity and IP flow mobility specified provides the UE with control as to what filter rules are installed for the UE in the core network at any given time. This means that, as currently specified, the UE is in charge of calculating the filter rules from the Inter Mobility Policies provided by the network operator, and the UE will send these rules inside CMIP signals to the network where they will be installed into the PCC architecture without any verification.

A problem with this arrangement is that because the UE has control over the filter rules, it can therefore control the behaviour of the core network by simply updating filter rules with CMIP signalling. Even though CMIP signalling is protected with the IPsec security protocol, there remains the possibility that attackers could set filter rules in the PCC architecture that consume resources from other users. Even bigger problems can arise with wrongly-configured and active UEs in the network. For example, a large number of poorly behaving UEs accessing the network could end up deteriorating the capabilities of the whole network by installing filter rules that are clearly wrong or totally contrary to the policies of the network operator. As the architecture is currently defined, no verification is required that the filter rules generated by the UE comply with the Inter Mobility Policies provided by the operator or the EPC network. There is no operator control over filter rules what so ever!

The present invention has been conceived with the foregoing in mind.

SUMMARY OF THE INVENTION

According to a first aspect of the invention there is provided a network node of a telecommunications packet network. The network node is configured to receive filter rules provided by a user entity, UE, relating to a requested IP-CAN session. The filter rules are applied by a Policy and Charging Control, PCC, network architecture for the session. The network node is also configured to compare the received filter rules with Inter Mobility Policies, IMPs, of the user so as to determine if the filter rules match with the user's IMPs, and to send a filter rule verification response indicating whether or not the filter rules match the user's IMPs.

In embodiments, the user's IMPs may be stored in a database in the network, the node being configured to retrieve the user's IMPs from the database. The network node may be a Policy and Charging Rules Function, PCRF. Alternatively, the filter rules may be provided in a verification request received from a PCRF over an interface between the network node and the PCRF. The network node may be a high level policy server, such as an Access Network Discovery and Selection Function, ANDSF. The network node may be configured to send the filter rule verification response to the PCRF over the interface.

According to a second aspect of the invention there is provided a system for verifying access filter rules relating to an IP-CAN session requested by a user entity, UE, of a telecommunications packet network. The filter rules are provided for application by a Policy and Charging Control, PCC, network architecture for the session. The system comprises: a Policy and Charging Rules Function, PCRF; a high level policy server; and a network interface between the PCRF and the high level policy server. The PCRF is configured, on receiving the access filter rules of the requested IP-CAN session, to send a filter rule verification request over the interface to the high level policy server. The high level policy server has access to the user's Inter Mobility Policies, IMPs, and is configured to compare the filter rules of the requested session with the user's IMPs, and to return to the PCRF a filter rule verification response indicating if the filter rules match the user's IMPs.

The high level policy server is an Access Network Discovery and Selection Function, ANDSF.

According to a third aspect of the invention there is provided a system for verifying access filter rules relating to an IP-CAN session requested by a user entity, UE, of a telecommunications packet network. The filter rules are provided for application by a Policy and Charging Control, PCC, network architecture for the session. The system comprises: a Policy and Charging Rules Function, PCRF; and a database storing the user's Inter Mobility Policies, IMPs. The PCRF is configured, on receiving the access filter rules of the requested IP-CAN session, to retrieve the user's IMPs from the database, to compare the filter rules of the requested session with the user's IMPs and to make a determination as to whether the filter rules match the user's IMPs.

In embodiments of the second or third aspect, the PCRF may be further configured, on determining that the filter rules match the user's IMPs, to forward the filter rules so that these can be installed in the PCC architecture and the requested session can proceed. The PCRF may be further configured, on determining that the filter rules do not match the user's IMPs, to provide an error indication for sending to the UE. The system may also comprise a network node having a reference point for exchanging messages with the UE, which is configured to provide an error code to the UE indicating that the filter rules do not match the user's IMPs.

According to a fourth aspect of the invention there is provided a method of verifying access filter rules relating to an IP-CAN session requested by a user of a telecommunications packet network. The filter rules are provided for application by a Policy and Charging Control, PCC, network architecture for the session. The method comprises: receiving the filter rules provided by the user; accessing Inter Mobility Policies, IMPs, of the user; comparing the received filter rules with the user's IMPs to determine if there is a match; and providing a filter rule verification response indicating whether or not the filter rules match the IMPs.

In embodiments the filter rules may be received at a Policy and Charging Rules Function, PCRF. The PCRF accesses the user's IMPs from a database in the network, makes the comparison to determine if there is match and provides the filter rule verification response.

Alternatively, the filter rules may be received at a Policy and Charging Rules Function, PCRF, which sends a filter rule verification request to a high-level policy server over an interface between the PCRF and the server. The high level policy server accesses the user's IMPs, makes the comparison to determine if there is a match, and provides the filter rule verification response to the PCRF over the interface.

In embodiments, if it is determined that the filter rules match the user's IMPs, the PCRF provides the filter rules for installation in the PCC architecture so that the requested session can proceed, and if it is determined that the filter rules do not match the user's IMPs, the PCRF provides an error indication for returning to the UE.

In embodiments, a network node having a reference point for exchanging messages with the UE, provides an error code to the UE when the filter rules do not match the user's IMPs.

It is an advantage that embodiments of these aspects allow control of multi-access mobility to be given back to the operator of the core network, and ensure that UEs follow the Inter Mobility Policies. This enables operators to optimise network resources. Implementation provides a significant improvement in the ability of the operator to control the resource usage at a small cost in terms of the changes that are required to existing network components.

DETAILED DESCRIPTION

Figure 1A:
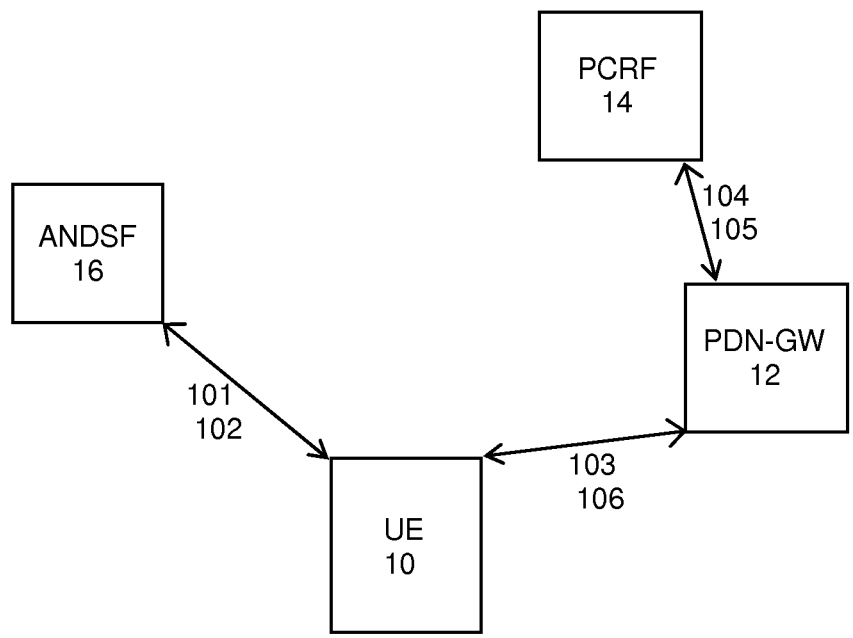
FIGS. 1a and 1b are, respectively, a schematic illustration and associated signal flow diagram of a system as currently envisaged.
Figure 1B:
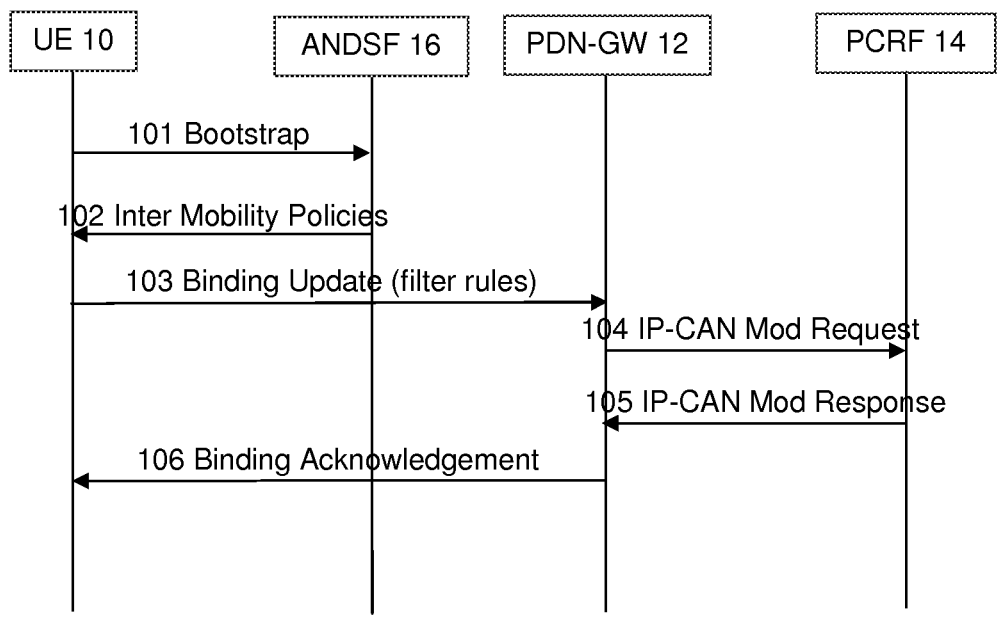

FIGS. 1a and 1b show the filter rule setup process as currently specified in the 3GPP standard (see Mobile IPv6 Support for Dual Stack Hosts and Routers, Internet Engineering Task Force Request for Comments, IETF RFC 5555). A UE 10 attaches to the network by first sending a bootstrap message 101 to the EPC network entity, ANDSF 16, which provides, in a return message 102, a set of Inter Mobility Policies (or IP Flow Policies). These policies are a high level set of instructions as to how the UE 10 should access the network for certain types of applications and in given conditions (e.g. time of day, roaming scenarios, at certain cost etc.). Based on these policies, the UE 10 then determines its low level filter rules when it requests an IP-CAN session for a particular application flow at any given time.

These filter rules are sent inside a CMIP (DSMIPv6) Binding Update message 103 to the user's Home Agent (HA) in the PDN-GW 12. If CMIP is in use, as in the present illustration, the HA and the UE communicate with each other using Binding Update and Binding Acknowledgement messages. The filter rules are then forwarded in an IP-CAN Modification Request 104 to the Policy and Charging Rules Function (PCRF) 14, which ensures that session traffic coming downstream to the UE 10 is also routed through the correct access. The PCRF 14 returns an IP-CAN Modification Response 105. The HA in the PDN-GW 12 then initiates an IP-CAN session modification procedure in the PCC architecture to reserve the needed bandwidth (Quality of Service, QoS) for the new flow. If the IP-CAN session modification succeeds, the HA will inform the UE 10 in a Binding Acknowledgement message 106, with a status indication of "0", indicating that it can start sending and receiving data through the access interface.

Figure 2A:
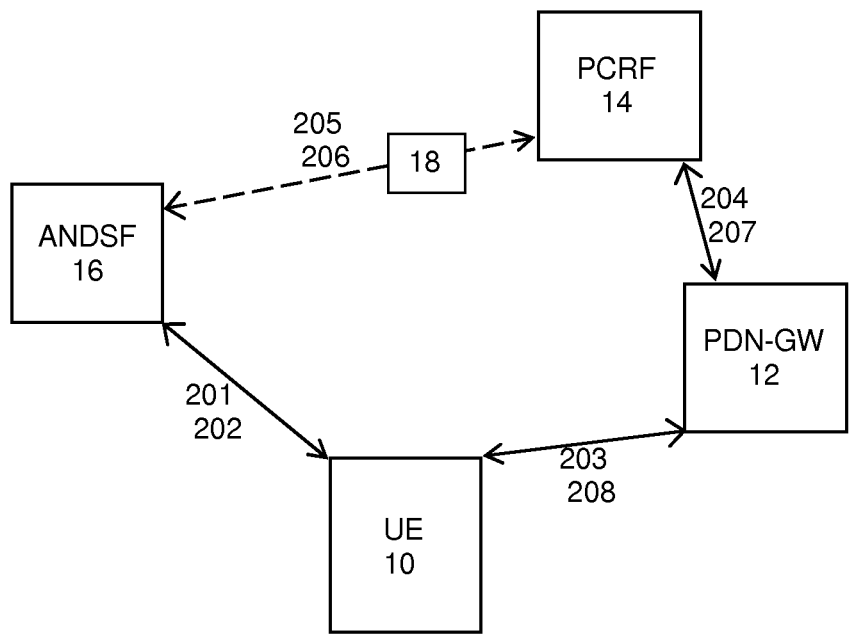
FIGS. 2a and 2b are, respectively, a schematic illustration and associated signal flow diagram of a system according to a first embodiment.
Figure 2B:
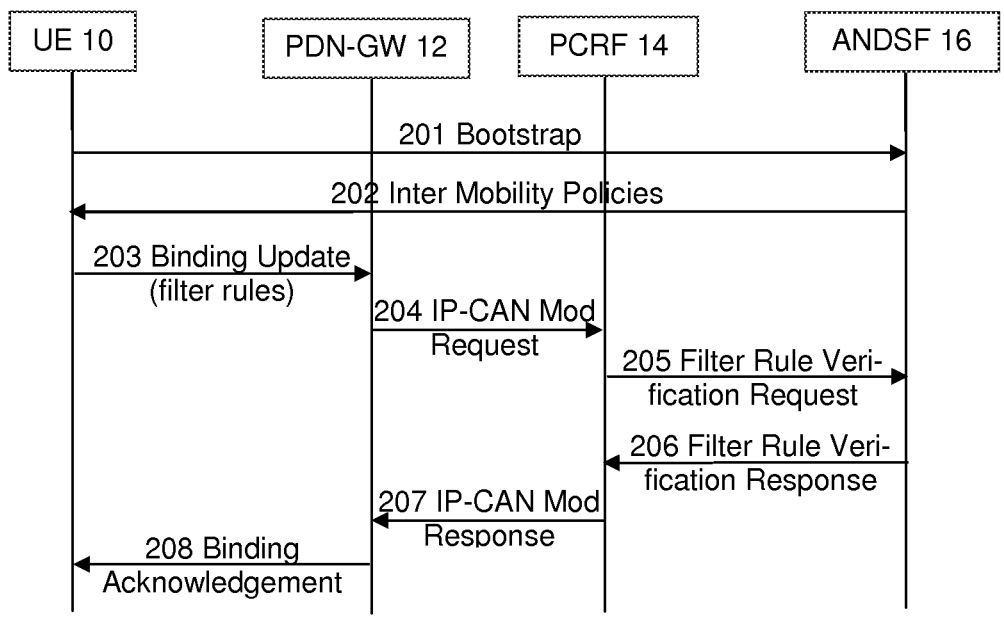
Figure 3A:
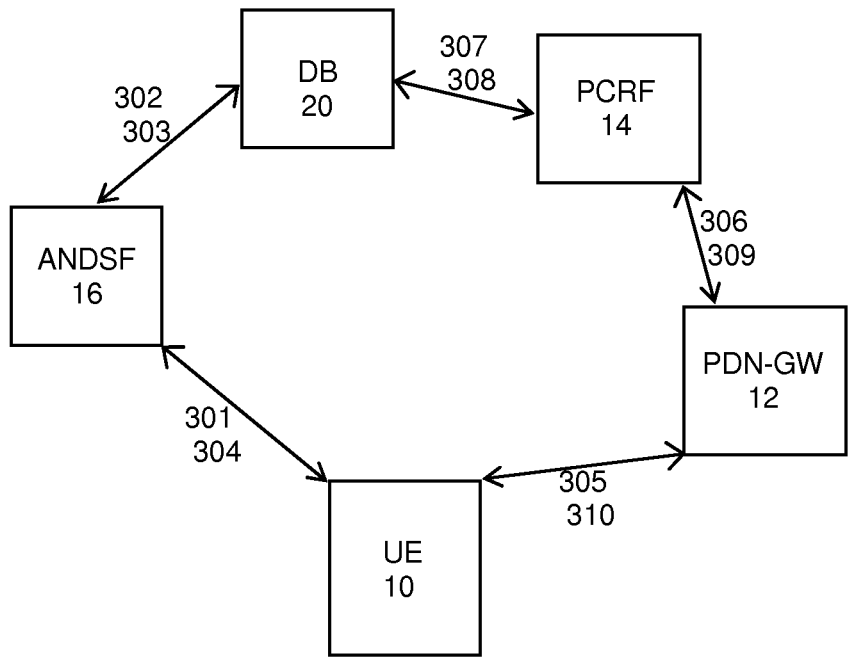
FIGS. 3a and 3b are, respectively, a schematic illustration and associated signal flow diagram of a system according to a second embodiment.
Figure 3B:
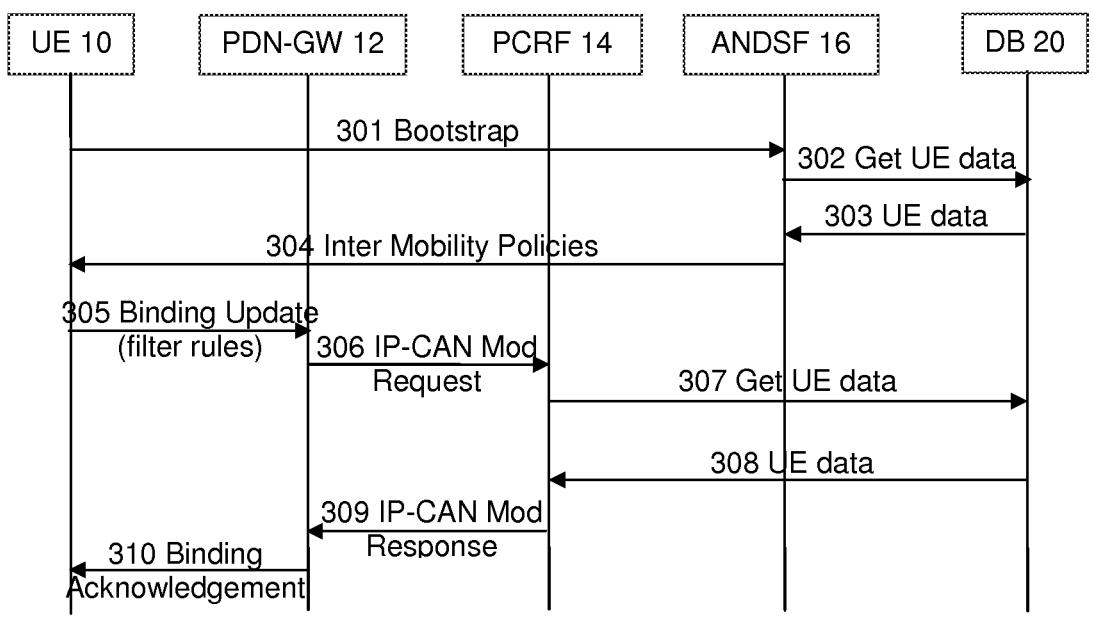

As discussed above, problems arise because the network operator has no control over the filter rules that are applied by the UE 10. One way to mitigate these problems is shown in FIGS. 2a and 2b, while an alternative is shown in FIGS. 3a and 3b.

To enable the operator to have control over the access selection and IP flow mobility in the EPC network, the network must have functionality to check that the filter rules conform to the Inter Mobility policies configured for the UE 10. This can be done by the ANDSF 16 if the policies are only stored in it, or by the PCRF if it can access the policies from, for example, a global database. FIG. 2a shows schematically the entities and signals exchanged between them, while FIG. 2b is the corresponding signal flow diagram. Equivalent entities carry the same reference numerals as used in FIGS. 1a and 1b. As shown in FIG. 2a, when compared with FIG. 1a a new interface reference point 18 is defined between the PCRF 14 and the ANDSF 16. This reference point allows the PCRF 14 to request verification by the ANDSF 16 of the filter rules sent by the UE 10 when it requests a new access.

As in the currently-specified procedure of FIGS. 1a and 1b, the UE 10 attaches to the network by sending a bootstrap message 201 to the ANDSF 16, which provides the Inter Mobility Policies in a return message 202. The UE sends a Binding Update message 203 to the PDN-GW 12, which includes the filter rules. The filter rules are then forwarded in an IP-CAN Modification Request 204 to the PCRF 14. Now, the PCRF sends a Filter Rule Verification Request 205 to the ANDSF over the new reference point 18. This includes an identification of the user and the received filter rules. The ANDSF 16, on receiving the Filter Rule Verification Request 205 is then configured to compare the filter rules with the user's Inter Mobility Policies to determine if there is a match. The ANDSF 16 sends a Filter Rule Verification Response 206, the content of which will depend on the results of its determination. Based on the Filter Rule Verification Response 206 received from the ANDSF 16, the PCRF 14 will then either deny the filter rules or put them into use. As shown in FIGS. 2a and 2b, this is done by way of the IP-CAN Modification Response 207 sent from the PCRF 14 to the PDN-GW 12, and a Binding Acknowledgement message 208 sent to the UE 10.

If the ANDSF 16 has determined that the filter rules match the Inter Mobility Policies, then, as in the current procedure shown in FIGS. 1a and 1b, the HA in the PDN-GW 12 initiates an IP-CAN session modification procedure in the PCC architecture to reserve the QoS for the new flow. If the IP-CAN session modification succeeds, the HA then informs the UE 10 in a Binding Acknowledgement message 208 with a "0" status indicating that it can start sending and receiving data through the access interface.

Alternatively, if the ANDSF has determined that the filter rules do not match the Inter Mobility Policies, then the IP-CAN Modification Response 207 sent from the PCRF 14 to the PDN-GW 12 will include an indication that the request is to be denied. In that case, the HA in the PDN-GW 12 will not initiate an IP-CAN modification procedure, but instead will notify the UE 10 that its request is being denied. This means that an EPC node, for example the PDN-GW 12, that has a reference point with the UE 10 (e.g. CMIP, Proxy Mobile IP—PMIP, GPRS Tunneling Protocol—GTP, or other appropriate protocol) can signal the error to the UE 10. This might, for example, be included in the functionality of the HA, set up to provide appropriate error codes for this purpose in the Binding Acknowledgement message 208 sent to the UE 10.

In CMIP, a Binding Acknowledgement message includes a status indicator, which can contain error codes—in fact if the status of the Binding Acknowledgement is not zero, it is an error. Thus, a new error code value would be assigned to inform the UE 10 that the access has been denied due to filter rules that do not match the Inter Mobility Policies. Similarly, the Proxy Mobile IP PMIPv6 protocol uses Proxy Binding Update and Proxy Binding Acknowledgement (PBU and PBA) messages between a Mobile Access Gateway (MAG) and Local Mobility Anchor (LMA). PBA has a similar status field which is zero if everything is normal and non-zero if an error occurs.

FIGS. 3a and 3b illustrate an alternative system and method. Again equivalent entities carry the same reference numerals as in FIGS. 1a, 1b, 2a and 2b. Instead of providing a new reference point between the PCRF 14 and the ANDSF 16, the Inter Mobility Policies are stored in a global database, DB 20, which is accessible by both the PCRF 14 and the ANDSF 16. In this case the Inter Mobility Policies are not stored at the ANDSF 16, so instead, after the UE 10 has attached by sending a bootstrap message 301, the ANDSF 16 fetches, at steps 302 and 303, the Inter Mobility Policies from the DB 20, and provides these at step 304 to the UE 10. the UE 10, sends the filter rules in a Binding Update message 305 (as before), and these are forwarded in an IP-CAN Modification Request from the PDN-GW 12 to the PCRF 14 (as before). However, in this case the PCRF 14 is configured to carry out the verification procedure itself. To do this it fetches, at steps 307 and 308, the user's Inter Mobility Policies from the DB 20 and performs a comparison to see if there is a match with the filter rules sent by the UE 10. If there is a match, then, as in the current procedure shown in FIGS. 1a and 1b and in the previous embodiment shown in FIGS. 2a and 2b, an IP-CAN Modification Response 309 is sent from the PCRF 14 to the PDN-GW 12. The HA in the PDN-GW 12 then initiates an IP-CAN session modification procedure in the PCC architecture to reserve the QoS for the new flow, and provided the IP-CAN session modification succeeds, then informs the UE 10 by sending a Binding Acknowledgement message 310, with a "0" status indication. Alternatively, if the PCRF 14 determines that the filter rules do not match the Inter Mobility Policies, then the IP-CAN Modification Response 207 sent from the PCRF 14 to the PDN-GW 12 will include an indication that the request is to be denied. In that case, the HA in the PDN-GW 12 will not initiate an IP-CAN modification procedure, but instead will notify the UE 10 that its request is being denied by sending a status indicator with the appropriate error code in the Binding Acknowledgement message 310, as above.

Figure 4:
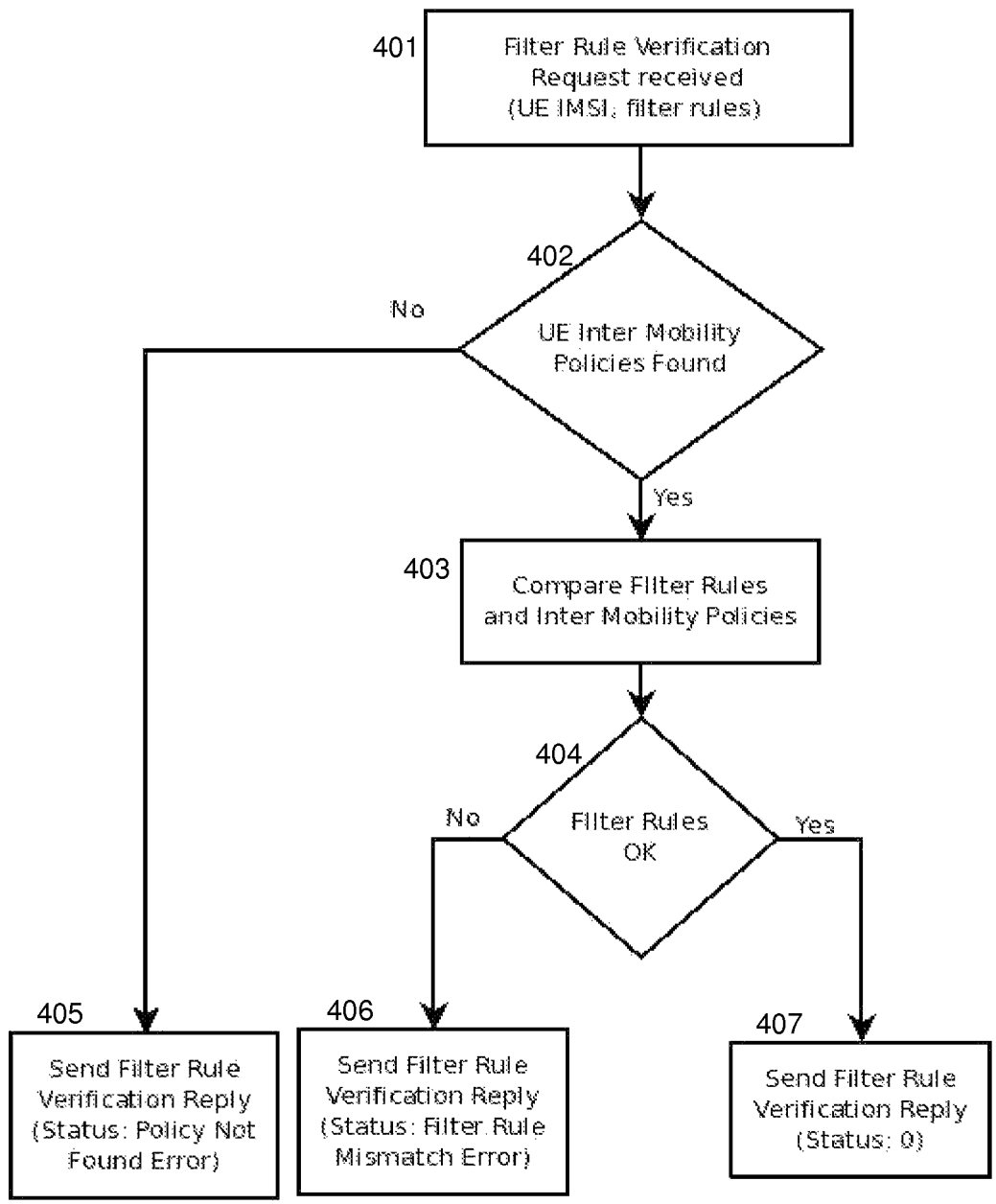
FIG. 4 is a flow diagram illustrating methodology in operation of the first embodiment of FIGS. 2a and 2b.

FIG. 4 shows the filter rule verification procedure for the embodiment of FIGS. 2a and 2b. The procedure is performed in the ANDSF 16. At step 401 the ANDSF 16 receives a Filter Rule Verification Request for a UE, which includes the UE's Filter Rules for the requested session (sent from the PCRF 14 over the new reference point 18). At step 402, the ANDSF 16 searches for the UE's Inter Mobility Policies. If the UE's policies are not found, the ANDSF 16 will send (step 405) a Filter Rule Verification Reply indicating an error, with a status of "Policy Not Found". If the Inter Mobility Policies are found, then at step 403 the ANDSF 16 compares these with the Filter Rules. At step 404, if the Filter Rules are found not to match (conform to) the Inter Mobility Policies, then the ANDSF 16 proceeds (step 406) to send a Filter Rule Verification Reply indicating an error, with a status of "Filter Rule Mismatch". If at step 404 the ANDSF 16 finds that the Filter Rules match the Inter Mobility Policies, then at step 407 it sends a Filter Rule Verification Reply indicating a status of "0", which acts as an instruction to the PCRF 14 to use these Filter Rules to set up the session. The process of how these rules are matched to the policies depends on the syntax of both the high level policies and the low level filter rules, but is a detail that is not important for an understanding of the principles. One possibility would be for the ANDSF 16 to produce a set of filter rules based on the Inter Mobility Policies of the UE and see if the received filter rules match with these.

Figure 5:
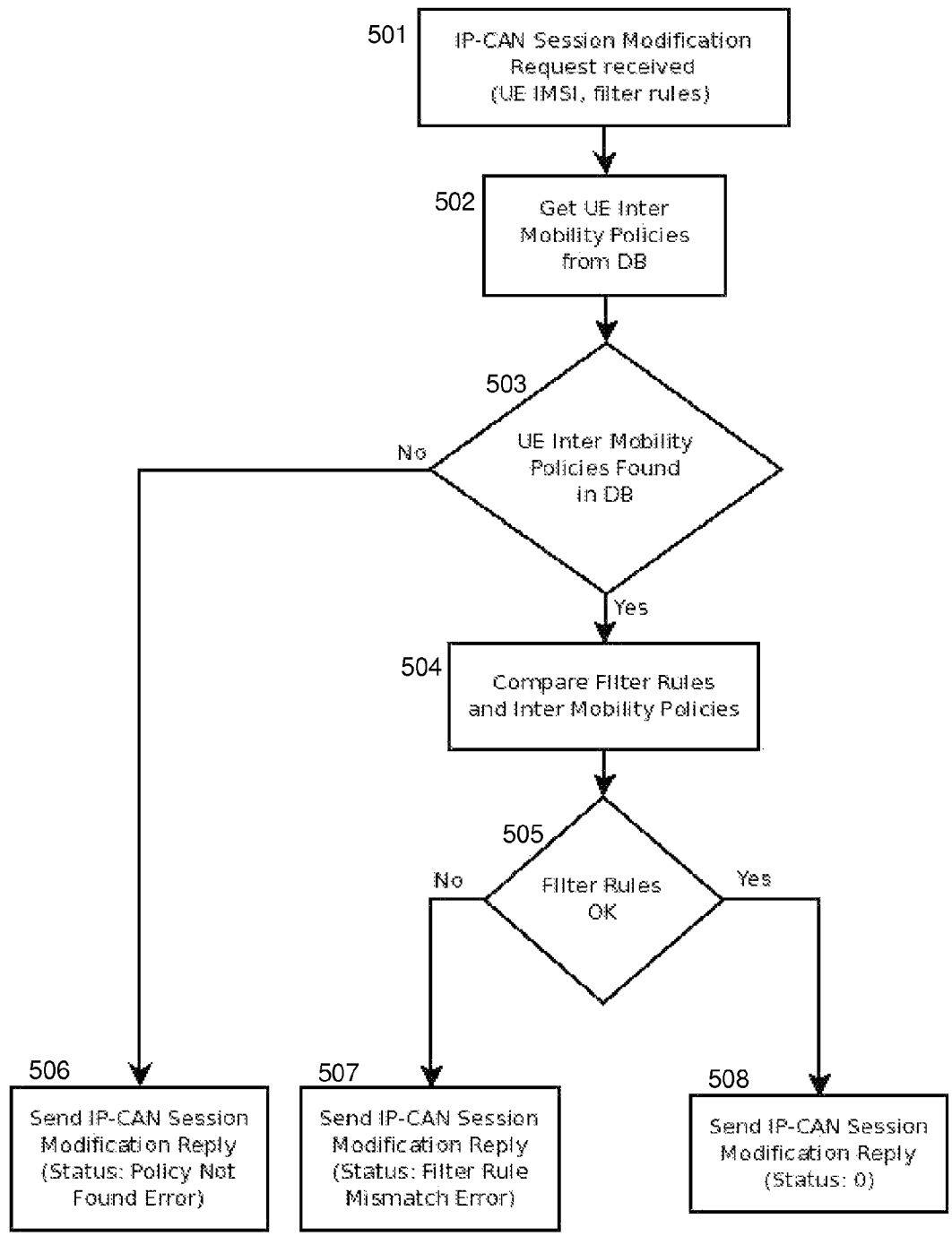
FIG. 5 is a flow diagram illustrating methodology in operation of the second embodiment of FIGS. 3a and 3b.

FIG. 5 shows the filter rule verification procedure for the embodiment of FIGS. 3a and 3b. Here, the filter rule verification procedure is performed by the PCRF 14. The procedure is similar to the flow diagram shown in FIG. 4 and described above. The main differences are that the PCRF 14 acquires the policy information from the database DB 20, and it sends the verification reply status inside the IP-CAN Session Modification Response message to directly to the PDN-GW 12.

Thus, at step 501 the PCRF 14 receives a Filter Rule Verification Request for a UE, which includes the UE's Filter Rules for the requested session (sent from the PDN-GW 12). At step 502, the PCRF 14 fetches the UE's Inter Mobility Policies from the DB 20. At step 503, if the UE's policies are not found (i.e. not able to be provided by the DB 20), the PCRF 14 will send (step 506) an IP-CAN Session Modification Reply indicating an error, with a status of "Policy Not Found". If the Inter Mobility Policies are found, then at step 504 the PCRF 14 compares these with the Filter Rules. At step 505, if the Filter Rules are found not to match the Inter Mobility Policies, then the PCRF 14 proceeds (step 507) to send a IP-CAN Session Modification Reply indicating an error, with a status of "Filter Rule Mismatch". If at step 505 the PCRF 14 finds that the Filter Rules match the Inter Mobility Policies, then at step 508 it sends an IP-CAN Session Modification Reply indicating a status of "0" and proceeds to use these Filter Rules to set up the session.

It is clear that this embodiment requires processing resources in the PCRF node to perform the comparison between the filter rules and policies.

It will be readily apparent from the above, that the control of multi-access mobility is given back to the operator of the core network, as it will ensure that UEs follow the Inter Mobility Policies. This enables operators to optimise network resources, because, if UEs are able to set filter rules that are in contradiction to their Inter Mobility Policies, resource usage optimization of the network becomes impossible. Implementation brings a significant improvement in the ability of the operator to control the resource usage at a small cost in terms of the changes that are required to existing components.

The invention claimed is:

1. A telecommunications system of a telecommunications packet network comprising:
at least one processor;
at least one non-transitory computer readable storage medium comprising instructions, wherein execution of the instructions by the at least one processor causes the telecommunication system to:
receive filter rules provided by a user entity (UE) relating to a requested Internet Protocol Connectivity Access Network (IP-CAN) session, wherein the filter rules are applied by a Policy and Charging Control (PCC) network architecture for the IP-CAN session, wherein the IP-CAN session is initiated by the UE conveying bootstrap information to an Access Network Discovery and Selection Function (ANDSF), which responsively identifies a set of Inter Mobility Policies (IMPs) corresponding to the UE to be applied to the IP-CAN session;
retrieve the IMPs associated with the UE from a database in the telecommunications packet network, wherein the IMPs are a set of instructions to the UE for accessing the telecommunications packet network for one or more applications;
convey a filter rule verification request for the received filter rules to the ANDSF;
compare, at the ANDSF, the received filter rules with the retrieved IMPs associated with the UE so as to determine if the filter rules match with the IMPs associated with the UE; and
send, from the ANDSF, a filter rule verification response indicating whether or not the filter rules match the IMPs associated with the UE, wherein the filter rules are applied to the IP-CAN session when the filter rule verification response indicates that the filter rules match.

2. A telecommunications system of a telecommunications packet network comprising:
at least one processor;
at least one non-transitory computer readable storage medium comprising instructions, wherein execution of the instructions by the at least one processor causes the telecommunication system to:
receive bootstrap information from a user entity (UE) for an Internet Protocol Connectivity Access Network (IP-CAN) session;
responsively identify a set of Inter Mobility Policies (IMPs) corresponding to the UE to be applied to the IP-CAN session;
receive, in a filter rule verification request from a Policy and Charging Rules Function (PCRF) over an interface between the network node and the PCRF, wherein the verification request identifies filter rules for the IP-CAN session wherein the filter rules are applied by a Policy and Charging Control (PCC) network architecture for the IP-CAN session;
compare, at an Access Network Discovery and Selection Function (ANDSF), the received filter rules with Inter Mobility Policies (IMPs) associated with the UE so as to determine if the filter rules match with the IMPs associated with the UE; and
send, from the ANDSF, a filter rule verification response indicating whether or not the filter rules match the IMPs associated with the UE, wherein the filter rules are applied to the IP-CAN session when the filter rule verification response indicates that the filter rules match.

3. The telecommunications system of claim 2 wherein the network node is a high level policy server, such as an Access Network Discovery and Selection Function (ANDSF).

4. The telecommunications system of claim 2, configured to send the filter rule verification response to the PCRF over the interface.

5. A system for verifying access filter rules relating to an Internet Protocol Connectivity Access Network (IP-CAN) session requested by a user entity (UE) of a telecommunications packet network, the system comprising:
a Policy and Charging Rules Function (PCRF) network node, comprising hardware;
a policy server, comprising hardware, referred to as an Access Network Discovery and Selection Function (ANDSF); and
a network interface between the PCRF network node and the policy server, which are remotely located from one another;
wherein access filter rules are provided for an application by a Policy and Charging Control (PCC) network architecture for the IP-CAN session;
wherein the PCRF network node is configured to:
on receiving the access filter rules of the IP-CAN session, send a filter rule verification request over the network interface to the policy server;

wherein the policy server has access to Inter Mobility Policies (IMPs) associated with the UE and is configured to compare the access filter rules of the requested IP-CAN session with the IMPs associated with the UE, and to return to the PCRF network node a filter rule verification response indicating if the access filter rules match the IMPs associated with the UE, wherein the filter rules are applied to the IP-CAN session when the filter rule verification response indicates that the filter rules match.

6. The system of claim 5 wherein the policy server is the Access Network Discovery and Selection Function (ANDSF).

7. The system of claim 5, wherein the PCRF network node is further configured, on determining that the access filter rules match the IMPs associated with the UE, to forward the access filter rules so that the access filter rules can be installed in the PCC architecture and the requested Internet Protocol Connectivity Access Network (IP-CAN) session can proceed.

8. The system of claim 5, wherein the PCRF network node is further configured, on determining that the access filter rules do not match the IMPs associated with the UE to provide an error indication for sending to the UE.

9. The system of claim 5, comprising a network node having a reference point for exchanging messages with the UE, which is configured to provide an error code to the UE indicating that the access filter rules do not match the IMPs associated with the UE.

10. A system for verifying access filter rules relating to an Internet Protocol Connectivity Access Network (IP-CAN) session requested by a user entity (UE) of a telecommunications packet network, the system comprising:
 a Policy and Charging Rules Function (PCRF) network node, comprising hardware; and
 a database storing Inter Mobility Policies (IMPs) associated with the UE;
 wherein the access filter rules are provided for an application by a Policy and Charging Control (PCC) network architecture for the IP-CAN session, wherein the IP-CAN session is initiated by the UE conveying bootstrap information to an Access Network Discovery and Selection Function (ANDSF), which responsively identifies a set of Inter Mobility Policies (IMPs) corresponding to the UE to be applied to the IP-CAN session;
 wherein the PCRF network node is configured, on receiving the access filter rules of the requested IP-CAN session, to retrieve the IMPs associated with the UE from the database, wherein the IMPs are a set of instructions to the UE for accessing the telecommunications packet network for one or more applications, and
 to compare the access filter rules of the requested IP-CAN session with the IMPs associated with the UE and to make a determination as to whether the access filter rules match the IMPs associated with the UE, wherein the access filter rules are applied to the IP-CAN session when the access filter rules match.

11. A method of verifying access filter rules relating to an Internet Protocol Connectivity Access Network (IP-CAN) session requested by a user entity (UE) of a telecommunications packet network comprising:

providing access rules for an application by a Policy and Charging Control (PCC) network architecture for the IP-CAN session, wherein the IP-CAN session is initiated by the UE conveying bootstrap information to an Access Network Discovery and Selection Function (ANDSF), which responsively identifies a set of Inter Mobility Policies (IMPs) corresponding to the UE to be applied to the IP-CAN session;
receiving the access filter rules provided by the UE at a Policy and Charging Rules Function (PCRF), which is a network node comprising hardware;
accessing Inter Mobility Policies (IMPs) associated with the UE from a database in the network;
comparing the received access filter rules with the IMPs associated with the UE to determine if there is a match; and
providing a filter rule verification response indicating whether or not the access filter rules match the IMPs associated with the UE, wherein the access filter rules are applied to the IP-CAN session when the access filter rules match.

12. The method of claim 11, wherein if it is determined that the access filter rules match the IMPs associated with the UE, the PCRF provides the access filter rules for installation in the PCC architecture so that the requested IP-CAN session can proceed, and wherein if it is determined that the access filter rules do not match the IMPs associated with the user entity, the PCRF provides an error indication for returning to the UE.

13. The method of claim 11, wherein a network node having a reference point for exchanging messages with the UE, provides an error code to the UE when the access filter rules do not match the IMPs associated with the UE.

14. A method of verifying access filter rules relating to an Internet Protocol Connectivity Access Network (IP-CAN) session requested by a user of a telecommunications packet network, comprising:
 receiving access filter rules at a Policy and Charging Rules Function (PCRF), which is a network node comprising hardware, wherein the access filter rules are for the IP-CAN session, wherein the IP-CAN session is initiated by a user entity (UE) conveying bootstrap information to an Access Network Discovery and Selection Function (ANDSF), which responsively identifies a set of Inter Mobility Policies (IMPs) corresponding to the UE to be applied to the IP-CAN session;
 the PCRF sending a filter rule verification request to the ANDSF over an interface between the PCRF and the ANDSF, which is remotely located from the PCRF;
 accessing, at the ANDSF, Inter Mobility Policies (IMPs) associated with the UE;
 comparing, at the ANDSF, the received access filter rules with the IMPs associated with the UE to determine if there is a match; and
 providing a filter rule verification response from the ANDSF to the PCRF indicating whether or not the access filter rules match the IMPs associated with the UE, wherein the access filter rules are applied to the IP-CAN session when the access filter rules match.

\* \* \* \* \*